(12) United States Patent
Liang

(10) Patent No.: US 9,336,081 B2
(45) Date of Patent: *May 10, 2016

(54) DATA WRITING AND READING METHOD, AND MEMORY CONTROLLER AND MEMORY STORAGE APPARATUS USING THE SAME FOR IMPROVING RELIABILITY OF DATA ACCESS

(75) Inventor: Li-Chun Liang, Kaohsiung (TW)

(73) Assignee: PHISON ELECTRONICS CORP., Miaoli (TW)

( * ) Notice: Subject to any disclaimer, the term of this patent is extended or adjusted under 35 U.S.C. 154(b) by 1054 days.

This patent is subject to a terminal disclaimer.

(21) Appl. No.: 13/071,523

(22) Filed: Mar. 25, 2011

(65) Prior Publication Data

US 2012/0173955 A1 Jul. 5, 2012

(30) Foreign Application Priority Data

Dec. 30, 2010 (TW) .................................. 99146917 A

(51) Int. Cl.
*G06F 11/00* (2006.01)
*G06F 11/10* (2006.01)
*H03M 13/00* (2006.01)

(52) U.S. Cl.
CPC ........ *G06F 11/1048* (2013.01); *G06F 11/1012* (2013.01); *G06F 11/1044* (2013.01)

(58) Field of Classification Search
None
See application file for complete search history.

(56) References Cited

U.S. PATENT DOCUMENTS

| 8,560,926 | B2* | 10/2013 | Yeh ..................... G06F 12/0246 365/185.33 |
| 8,924,816 | B2* | 12/2014 | Khan ................... G06F 3/0641 348/14.13 |
| 2010/0281340 | A1* | 11/2010 | Franceschini et al. ........ 714/763 |
| 2012/0290898 | A1* | 11/2012 | Franceschini et al. ........ 714/768 |

FOREIGN PATENT DOCUMENTS

CN 101876947 11/2010

OTHER PUBLICATIONS

A. Jagmohan, M. M. Franceschini, L. A. Lastras-Montano, J. P. Karidis, Adaptive Endurance Coding for NAND Flash Proc. Globecom ACTEMT 2010, pp. 1841-1845, http://researcher.watson.ibm.com/researcher/files/us-franceschini/GC2010.pdf.*

* cited by examiner

*Primary Examiner* — Justin R Knapp
(74) *Attorney, Agent, or Firm* — Jianq Chyun IP Office

(57) ABSTRACT

A data writing method for a rewritable non-volatile memory module is provided. The present method includes compressing an original data to generate a first data and determining whether the length of the first data is smaller than a predetermined length. The present method also includes outputting the first data as a compressed data when the length of the first data is not smaller than the predetermined length. The present method further includes generating an ECC code corresponding to the compressed data, generating an ECC frame according to the compressed data and the ECC code, and writing the ECC frame into the rewritable non-volatile memory module. Accordingly, when data corresponding to the original data is read from the rewritable non-volatile memory module, error bits in the data can be corrected and the original data can be restored according to the ECC code.

9 Claims, 9 Drawing Sheets

DATA WRITING AND READING METHOD, AND MEMORY CONTROLLER AND MEMORY STORAGE APPARATUS USING THE SAME FOR IMPROVING RELIABILITY OF DATA ACCESS

CROSS-REFERENCE TO RELATED APPLICATION

This application claims the priority benefit of Taiwan application serial no. 99146917, filed Dec. 30, 2010. The entirety of the above-mentioned patent application is hereby incorporated by reference herein and made a part of this specification.

BACKGROUND

1. Technology Field

The present invention relates to a data writing and reading method for a rewritable non-volatile memory module and a memory controller and a memory storage apparatus using the same, wherein more error bits are corrected by using an existing error checking and correcting (ECC) circuit.

2. Description of Related Art

Along with the widespread of digital cameras, cell phones, and MP3 in recently years, the consumers' demand to storage media has increased drastically. Rewritable non-volatile memory is one of the most adaptable storage media to portable electronic products (for example, notebook computers) due to its many characteristics such as data non-volatility, low power consumption, small volume, non-mechanical structure, and fast access speed. A solid state drive (SSD) is a storage apparatus which uses a flash memory as its storage medium. Thereby, the flash memory industry has become a very important part of the electronic industry in recent years.

Because error bits may be produced in data stored in a flash memory due to various factors (for example, electric leakage of memory cells, program failure and so on), in general, an ECC circuit is configured in a memory storage system and an ECC code is generated for the data stored therein, so as to ensure the accuracy of the data.

To be specific, when a computer host connected with a flash memory storage apparatus sends data to be written into the flash memory storage apparatus, the ECC circuit of the flash memory storage apparatus generates a corresponding ECC code, and a control circuit of the flash memory storage apparatus writes both the data and the ECC code into the flash memory module of the flash memory storage apparatus. Subsequently, when the computer host is about to read the data from the flash memory storage apparatus, the control circuit reads the data and the corresponding ECC code from the flash memory module, and the ECC circuit executes an error checking and correcting procedure on the data according to the corresponding ECC code to ensure the accuracy of the data.

FIG. 1 is a diagram illustrating the data structure of data written into and read from a flash memory storage apparatus.

Referring to FIG. 1, during the data writing operation, an original data OD and an ECC code EC corresponding to the original data OD are written into the flash memory storage apparatus. Subsequently, when the original data OD is read from the flash memory storage apparatus, the ECC code EC is also read and an error checking and correcting procedure is executed on the original data OD according to the ECC code EC. For example, when the read data is accurate, the control circuit sends the read data to the computer host. When there are error bits EB in the read data, the error checking and correcting procedure executed by the ECC circuit tries to correct the error bits EB. Herein if the number of the error bits EB is within a correctable range, the error bits EB are corrected and the control circuit sends the corrected data to the computer host. Contrarily, if the number of the error bits EB exceeds the correctable range, the control circuit notifies the computer host that the data is lost.

Thereby, how to correct more error bits has become one of the major subjects in the industry.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present invention is directed to a data writing and reading method that can correct more error bits and ensure data accuracy.

The present invention is also directed to a memory controller that can correct more error bits.

The present invention is further directed to a memory storage apparatus with high reliability.

According to an exemplary embodiment of the present invention, a data writing method for writing data into a rewritable non-volatile memory module is provided. The data writing method includes compressing the data to generate a first data and determining whether the length of the first data is smaller than a predetermined length. The data writing method also includes outputting the first data as a compressed data when the length of the first data is not smaller than the predetermined length. The data writing method further includes generating an ECC code corresponding to the compressed data, generating an ECC frame according to the compressed data and the ECC code, and writing the ECC frame into the rewritable non-volatile memory module.

According to an exemplary embodiment of the present invention, a data reading method for reading data from a rewritable non-volatile memory module is provided. The data reading method includes reading an ECC frame from the rewritable non-volatile memory module and obtaining an uncorrected data and an ECC code from the ECC frame according to a predetermined padding data. The data reading method also includes correcting the uncorrected data according to the ECC code to generate a corrected data, decompressing at least a portion of the corrected data to obtain a decompressed data, and outputting the decompressed data as the data to be read.

According to an exemplary embodiment of the present invention, a memory controller for writing data from a host system into a rewritable non-volatile memory module is provided. The memory controller includes a host interface, a memory interface, a memory management circuit, an ECC circuit, and a data compression/decompression circuit. The host interface is configured to couple the host system. The memory interface is configured to couple the rewritable non-volatile memory module. The memory management circuit is coupled to the host interface and the memory interface and is configured for receiving the data through the host interface. The ECC circuit and the data compression/decompression circuit are coupled to the memory management circuit. The data compression/decompression circuit compresses the data to generate a first data. The data compression/decompression circuit determines whether the length of the first data is smaller than a predetermined length, and when the length of the first data is not smaller than the predetermined length, the data compression/decompression circuit outputs the first data as a compressed data. The ECC circuit generates an ECC code corresponding to the compressed data. The memory management circuit generates an ECC frame according to the compressed data and the ECC code and writes the ECC frame into the rewritable non-volatile memory module.

According to an exemplary embodiment of the present invention, a memory controller for reading data from a rewritable non-volatile memory module is provided. The memory controller includes a host interface, a memory interface, a memory management circuit, an ECC circuit, and a data compression/decompression circuit. The host interface is configured to couple a host system. The memory interface is configured to couple the rewritable non-volatile memory module. The memory management circuit is coupled to the host interface and the memory interface, and configured for transmitting the data to the host system through the host interface. The ECC circuit and the data compression/decompression circuit are coupled to the memory management circuit. The memory management circuit reads an ECC frame from the rewritable non-volatile memory module and obtains an uncorrected data and an ECC code from the ECC frame according to a predetermined padding data. The ECC circuit corrects the uncorrected data according to the ECC code to generate a corrected data, decompresses at least a portion of the corrected data to obtain a decompressed data, and outputs the decompressed data to the host system.

According to an exemplary embodiment of the present invention, a memory storage apparatus including a connector, a rewritable non-volatile memory module, and a memory controller is provided. The connector is configured to couple a host system. The memory controller is coupled to the connector and the rewritable non-volatile memory module, and configured for receiving data from the host system. The memory controller further compresses the data to generate a first data and determines whether the length of the first data is smaller than a predetermined length. When the length of the first data is not smaller than the predetermined length, the memory controller outputs the first data as a compressed data. In addition, the memory controller generates an ECC code corresponding to the compressed data, generates an ECC frame according to the compressed data and the ECC code, and writes the ECC frame into the rewritable non-volatile memory module.

According to an exemplary embodiment of the present invention, a memory storage apparatus including a connector, a rewritable non-volatile memory module, and a memory controller is provided. The connector is configured to couple a host system. The memory controller is coupled to the connector and the rewritable non-volatile memory module and configured for reading data from the rewritable non-volatile memory module and transmits the data to the host system. The memory controller reads an ECC frame from the rewritable non-volatile memory module and obtains an uncorrected data and an ECC code from the ECC frame according to a predetermined padding data. In addition, the memory controller further corrects the uncorrected data according to the ECC code to generate a corrected data, decompresses at least a portion of the corrected data to obtain a decompressed data, and outputs the decompressed data to the host system.

As described above, the data writing and reading method, the memory controller, and the memory storage apparatus provided by exemplary embodiments of the present invention can effectively correct more error bits.

These and other exemplary embodiments, features, aspects, and advantages of the present invention will be described and become more apparent from the detailed description of exemplary embodiments when read in conjunction with accompanying drawings.

It should be understood, however, that this Summary may not contain all of the aspects and embodiments of the present invention, is not meant to be limiting or restrictive in any manner, and that the present invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF THE EMBODIMENTS

Figure 1:
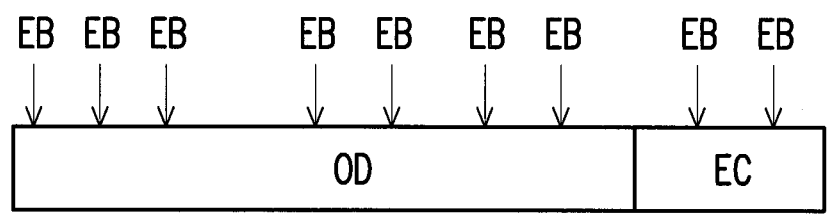
FIG. 1 is a diagram illustrating the data structure of data written into and read from a flash memory storage apparatus.

Reference will now be made in detail to the present preferred embodiments of the present invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Figure 2A:
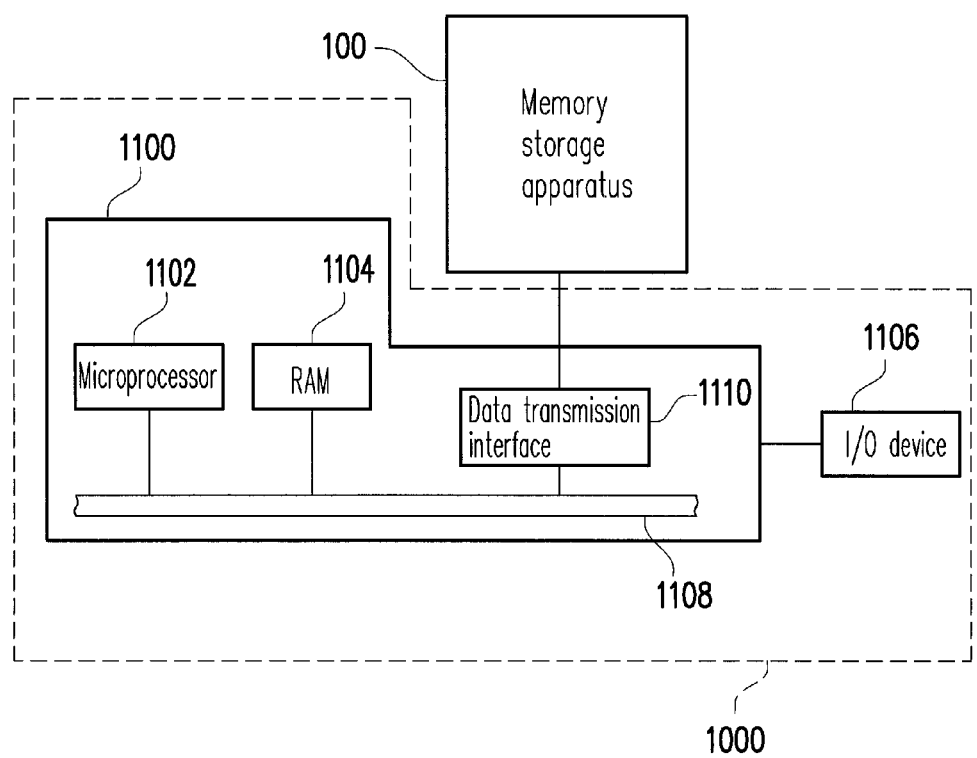
FIG. 2A illustrates a host system and a memory storage apparatus according to an exemplary embodiment of the present invention.

FIG. 2A illustrates a host system and a memory storage apparatus according to an exemplary embodiment of the present invention.

Referring to FIG. 2A, the host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 1B. However, the I/O device 1106 is not limited to the devices illustrated in FIG. 1B, and which may further include other devices.

Figure 2B:
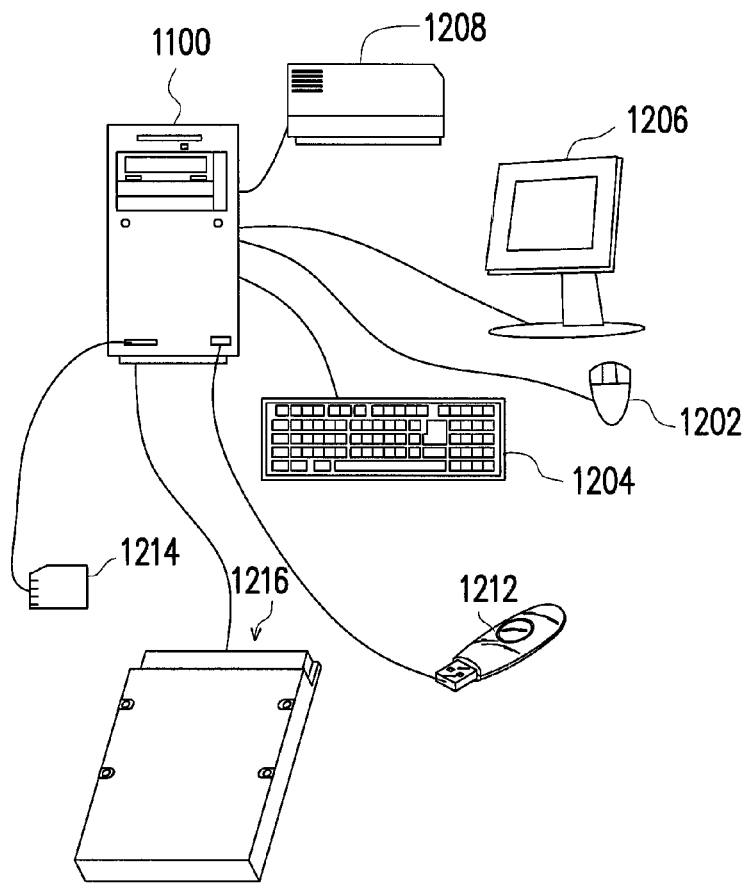
FIG. 2B is a diagram illustrating a computer, input/output (I/O) devices, and a memory storage apparatus according to an exemplary embodiment of the present invention.

In the present exemplary embodiment, a memory storage apparatus 100 is coupled to other components of the host system 1000 through the data transmission interface 1110. Through the operations of the microprocessor 1102, the RAM 1104, and the I/O device 1106, data can be written into or read from the memory storage apparatus 100. The memory storage apparatus 100 is a rewritable non-volatile memory storage apparatus, such as the flash drive 1212, the memory card 1214, or the solid state drive (SSD) 1216 illustrated in FIG. 2B.

Figure 2C:
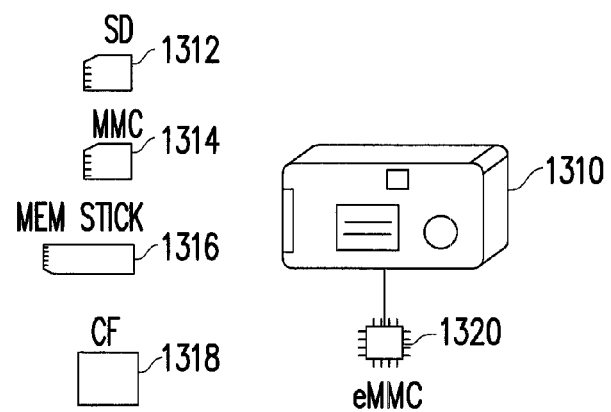
FIG. 2C is a diagram of a host system and a memory storage apparatus according to another exemplary embodiment of the present invention.

Generally speaking, the host system 1000 may be substantially any system that can cooperate with the memory storage apparatus 100 to store data. Even though the host system 1000 is described as a computer system in the present exemplary embodiment, the host system 1000 may also be a digital camera, a video camera, a communication device, an audio player, or a video player in another exemplary embodiment of the present invention. For example, if the host system is a digital camera (video camera) 1310, the rewritable non-volatile memory storage apparatus is then a secure digital (SD) card 1312, a multimedia card (MMC) 1314, a memory stick (MS) 1316, a compact flash (CF) card 1318, or an embedded storage device 1320 (as shown in FIG. 2C) used by the digital camera 1310. The embedded storage device 1320 includes an embedded MMC (eMMC). It should be mentioned that an eMMC is directly coupled to the motherboard of a host system.

Figure 3:
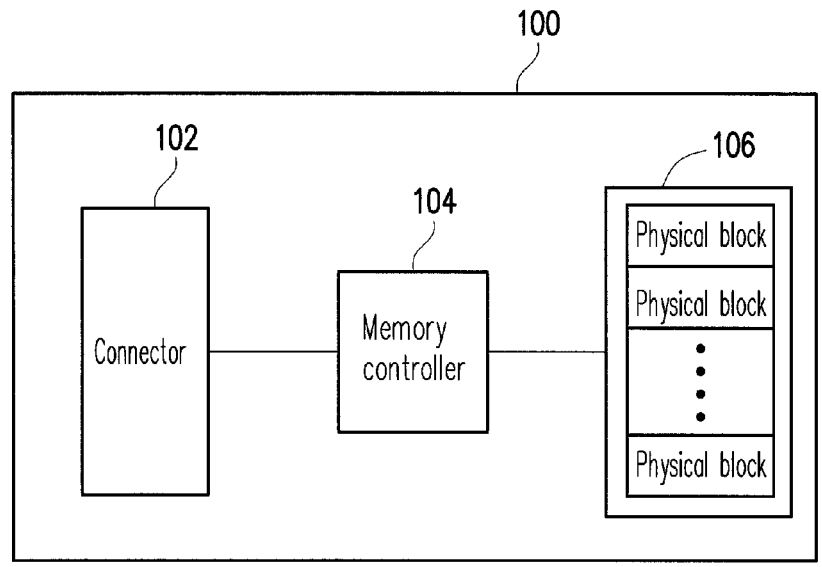
FIG. 3 is a schematic block diagram of the memory storage apparatus in FIG. 2A.

FIG. 3 is a schematic block diagram of the memory storage apparatus in FIG. 2A.

Referring to FIG. 3, the memory storage apparatus 100 includes a connector 102, a memory controller 104, and a rewritable non-volatile memory module 106.

In the present exemplary embodiment, the connector 102 complies with the serial advanced technology attachment (SATA) standard. However, the present invention is not limited thereto, and the connector 102 may also comply with the Parallel Advanced Technology Attachment (PATA), the Institute of Electrical and Electronic Engineers (IEEE) 1394 standard, the peripheral component interconnect (PCI) express standard, the universal serial bus (USB) standard, the SD interface standard, the MS interface standard, the MMC interface standard, the CF interface standard, the integrated drive electronics (IDE) interface standard, or any other suitable standard.

The memory controller 104 executes a plurality of logic gates or control instructions implemented in a hardware or firmware form and performs various data operations on the rewritable non-volatile memory module 106 according to instructions of the host system 1000.

The rewritable non-volatile memory module 106 is coupled to the memory controller 104 and configured for storing data written by the host system 1000. The rewritable non-volatile memory module 106 has a plurality of physical blocks. These physical blocks may belong to the same memory die or different memory dies. Each of the physical blocks has a plurality of physical pages, and each of the physical pages has at least one physical sector, wherein physical pages belonging to the same physical block can be individually written but have to be erased all together. To be specific, physical block is the smallest erasing unit. Namely, each physical block contains the least number of memory cells that are erased together. Physical page is the smallest programming unit. Namely, physical page is the smallest unit for writing data. However, in another exemplary embodiment of the present invention, the smallest unit for writing data may also be physical sector or any other unit.

Each physical block may be composed of 128 physical pages. However, the present invention is not limited thereto, and each physical block may also be composed of 64 physical pages, 256 physical pages, or any other number of physical pages. Each physical page includes a user data bit area and a redundancy bit area. The user data bit area is used for storing user data, and the redundancy bit area is used for storing system data (for example, ECC codes). In the present exemplary embodiment, the user data bit area of each physical page has a capacity of 2 kilobytes (KB), and the redundancy bit area thereof has a capacity of 64 bytes.

In the present exemplary embodiment, the rewritable non-volatile memory module 106 is a multi level cell (MLC) NAND flash memory module. However, the present invention is not limited thereto, and the rewritable non-volatile memory module 106 may also be a single level cell (SLC) NAND flash memory module, any other flash memory module, and any other memory module having the same characteristics.

Figure 4:
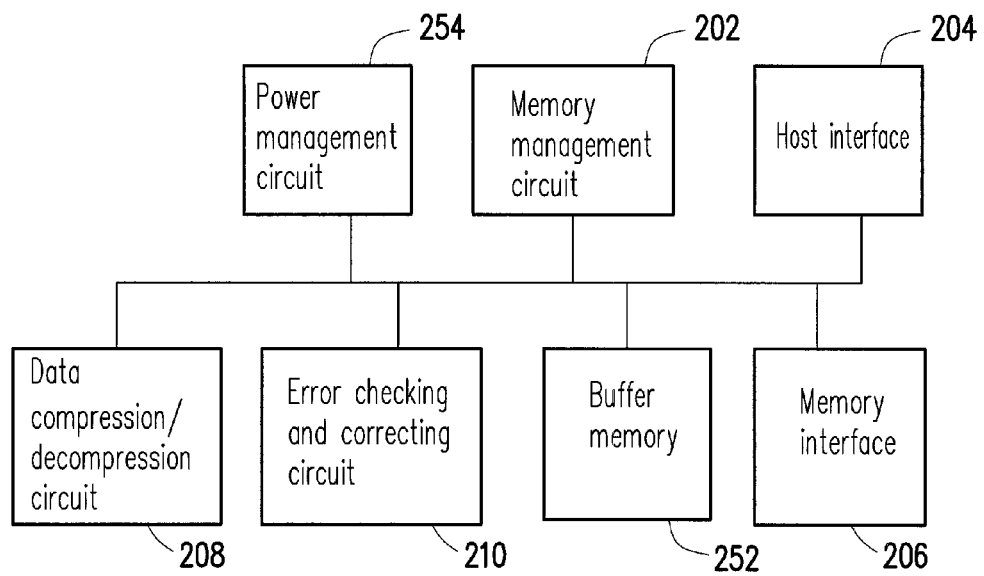
FIG. 4 is a schematic block diagram of a memory controller according to an exemplary embodiment of the present invention.

FIG. 4 is a schematic block diagram of a memory controller according to an exemplary embodiment of the present invention.

Referring to FIG. 4, the memory controller 104 includes a memory management circuit 202, a host interface 204, a memory interface 206, a data compression/decompression circuit 208, and an ECC circuit 210.

The memory management circuit 202 controls the overall operation of the memory controller 104. To be specific, the memory management circuit 202 has a plurality of control instructions, and during the operation of the memory storage apparatus 100, the control instructions are executed to accomplish various data operations.

In the present exemplary embodiment, the control instructions of the memory management circuit 202 are implemented in a firmware form. For example, the memory management circuit 202 has a microprocessor unit (not shown) and a read-only memory (ROM, not shown), and the control instructions are burnt into the ROM. When the memory storage apparatus 100 is in operation, the control instructions are executed by the microprocessor unit to accomplish various data operations.

In another exemplary embodiment of the present invention, the control instructions of the memory management circuit 202 may also be stored in a specific area (for example, the system area of a memory module exclusively used for storing system data) of the rewritable non-volatile memory module 106 as program codes. In addition, the memory management circuit 202 has a microprocessor unit (not shown), a ROM (not shown), and a RAM (not shown). In particular, the ROM has driver codes, and when the memory controller 104 is enabled, the microprocessor unit first executes the driver codes to load the control instructions from the rewritable non-volatile memory module 106 into the RAM of the memory management circuit 202. Thereafter, the microprocessor unit runs the control instructions to carry out various data operations. Moreover, in yet another exemplary embodiment of the present invention, the control instructions of the memory management circuit 202 may also be implemented in a hardware form.

The host interface 204 is coupled to the memory management circuit 202 and configured for receiving and identifying commands and data from the host system 1000. Namely, commands and data sent by the host system 1000 are transmitted to the memory management circuit 202 through the host interface 204. In the present exemplary embodiment, the host interface 204 complies with the SATA standard. However, the present invention is not limited thereto, and the host interface 204 may also comply with the PATA standard, the IEEE 1394 standard, the PCI express standard, the USB standard, the SD standard, the MS standard, the MMC standard, the CF standard, the IDE standard, or any other suitable data transmission standard.

The memory interface 206 is coupled to the memory management circuit 202 and configured to access the rewritable non-volatile memory module 106. Namely, data to be written into the rewritable non-volatile memory module 106 is converted by the memory interface 206 into a format acceptable to the rewritable non-volatile memory module 106.

The data compression/decompression circuit 208 is coupled to the memory management circuit 202. The data compression/decompression circuit 208 compresses data to be written into the rewritable non-volatile memory module 106 and decompresses data read from the rewritable non-volatile memory module 106. For example, the data compression/decompression circuit 208 includes a compressor and a decompressor. The compressor finds out data redundancy in an original data, removes the data redundancy, encodes the remaining data, and outputs the encoded data (i.e., compressed data). The decompressor decodes a compressed data through a predetermined procedure and outputs the decoded data (i.e., decompressed data). In the present exemplary embodiment, the data compression/decompression circuit 208 compresses data by using a lossless compression algorithm such that the compressed data can be restored.

The ECC circuit 210 is coupled to the memory management circuit 202 and configured for executing an error checking and correcting procedure to ensure data accuracy. To be specific, when a write command is executed, the ECC circuit 210 generates a corresponding ECC code for the data to be written, and the memory management circuit 202 writes the data and the corresponding ECC code into the rewritable non-volatile memory module 106. Subsequently, when the memory management circuit 202 reads the data from the rewritable non-volatile memory module 106, it also reads the ECC code corresponding to the data, and the ECC circuit 210 executes the error checking and correcting procedure on the data according to the ECC code. It should be mentioned that the number of error bits that can be corrected by the ECC circuit 210 is proportional to the length of the ECC code. Namely, the more error bits the ECC circuit 210 is designed to correct, the more storage space is needed for storing the ECC code. As described above, the redundancy bit area for storing ECC codes has a fixed capacity (which varies with different types of rewritable non-volatile memory modules). Thus, the error correcting algorithm adopted by the ECC circuit 210 is limited by the type of the rewritable non-volatile memory module 106. For example, in the present exemplary embodiment, the ECC circuit 210 can correct at most 40 error bits. Namely, the ECC circuit 210 can successfully correct the data as long as the number of error bits in the data does not exceed 40.

Particularly, in the present exemplary embodiment, when data is to be written into the rewritable non-volatile memory module 106, the data compression/decompression circuit 208 compresses the data and the ECC circuit 210 generates a corresponding ECC code for the data under the control of the memory management circuit 202. Because the compressed data is smaller, the protection capability of the ECC circuit 210 is relatively improved. Below, the data writing method and data reading method with improved error correcting capability through data compression will be explained in detail with reference to accompanying drawings.

In an exemplary embodiment of the present invention, the memory controller 104 further includes a buffer memory 252. The buffer memory 252 is coupled to the memory management circuit 202 and configured to temporarily store data and commands from the host system 1000 or data from the rewritable non-volatile memory module 106.

In an exemplary embodiment of the present invention, the memory controller 104 further includes a power management circuit 254. The power management circuit 254 is coupled to the memory management circuit 202 and configured to control the power supply of the memory storage apparatus 100.

In the present exemplary embodiment, as described above, after receiving a write command and a data corresponding to the write command from the host system 1000, the memory management circuit 202 of the memory controller 104 writes the data into the rewritable non-volatile memory module 106 in units of each physical page. In particular, the memory management circuit 202 generates an ECC frame according to the received data and the corresponding ECC code and writes the ECC frame into the rewritable non-volatile memory module 106. In the present exemplary embodiment, the length of the user data in an ECC frame is 2K. Accordingly, one physical page is capable of storing one ECC frame.

However, the present invention is not limited thereto, and in another exemplary embodiment of the present invention, the length of the user data in an ECC frame may also be 512 bytes or 1K. Namely, one physical page can store multiple ECC frames.

Figure 5:
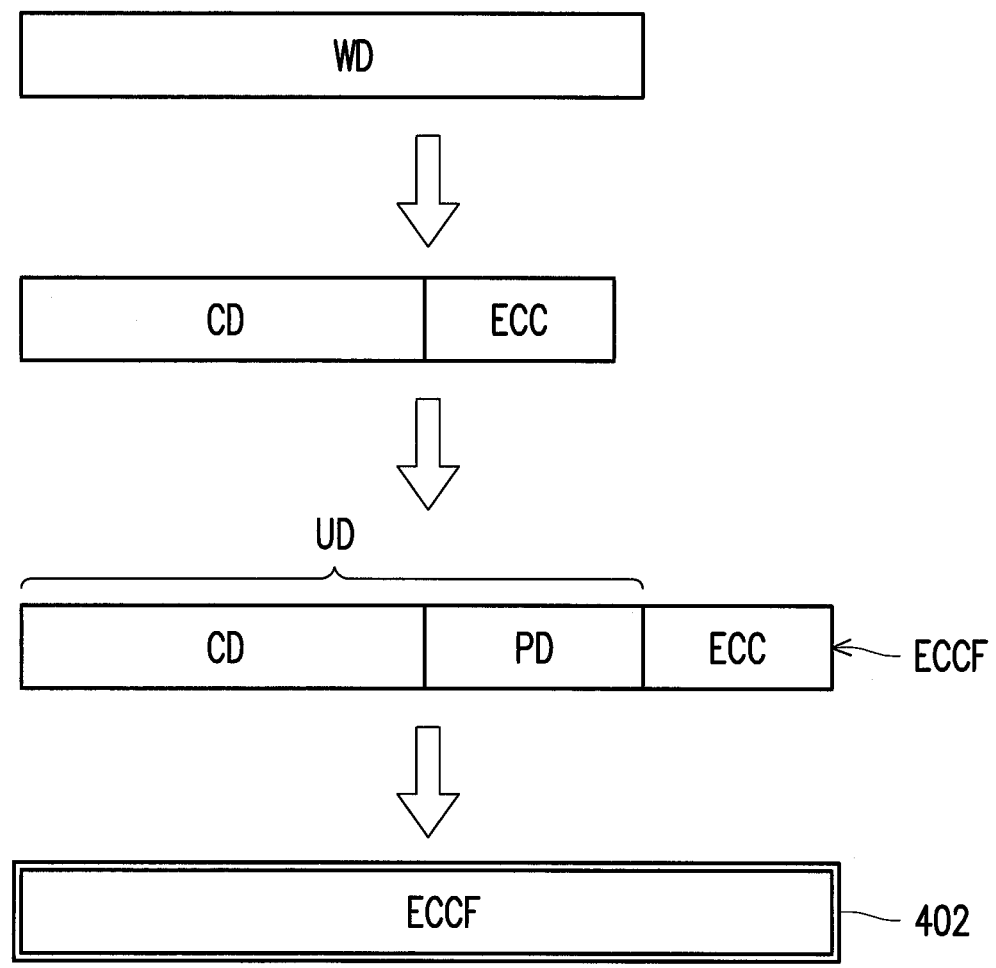
FIG. 5 is a diagram of writing data into a physical page according to an exemplary embodiment of the present invention.

FIG. 5 is a diagram of writing data into a physical page according to an exemplary embodiment of the present invention.

Referring to FIG. 5, when the memory management circuit 202 is about to write data WD having a length of 2K into a physical page 402, the data compression/decompression circuit 208 compresses the data WD to output a compressed data CD. It should be mentioned that the data compression/decompression circuit 208 compresses the data by using a lossless compression algorithm. However, the lengths of compressed data generated by compressing different data may be different. For the convenience of data management, the data compression/decompression circuit 208 outputs the compressed data with a predetermined length. Namely, the length of the compressed data CD is equal to the predetermined length.

For example, after the data compression/decompression circuit 208 compresses the data, it determines whether the length of the compressed data is equal to a predetermined length. When the length of the compressed data is smaller than the predetermined length, the data compression/decompression circuit 208 pads the compressed data by using a padding bit so as to make the length of the compressed data to be equal to the predetermined length. Herein the predetermined length is determined according to the compression ratio of the data compression/decompression circuit 208. Namely, the length of any data compressed by the data compression/decompression circuit 208 is always smaller than the predetermined length. For example, in the present exemplary embodiment, the data compression/decompression circuit 208 at least compresses data of 2K into data of 1K. Accordingly, the predetermined length is set to 1K.

Figure 6:
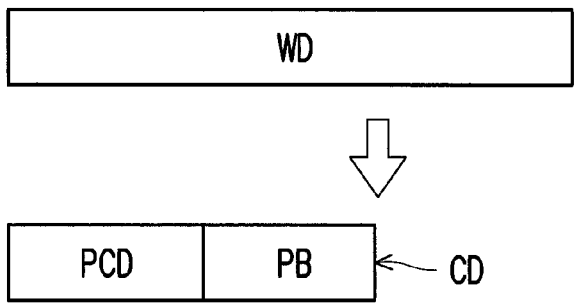
FIG. 6 is a diagram of filling padding bits into a compressed data according to an exemplary embodiment of the present invention.

FIG. 6 is a diagram of padding a padding bit into a compressed data according to an exemplary embodiment of the present invention.

Referring to FIG. 6, when the data WD is input to the data compression/decompression circuit 208 and a pre-compressed data PCD (i.e., a first data) having a length smaller than the predetermined length is generated, the data compression/decompression circuit 208 places at least one padding bit PB after the pre-compressed data PCD so as to make the length of the final compressed data CD to be equal to the predetermined length. Herein the padding bit PB is "F". However, the present invention is not limited thereto, and the padding bit may be any symbol. In particular, when the pre-compressed data PCD needs to be padded by using padding bits to generate the compressed data CD, the data compression/decompression circuit 208 stores padding information (i.e., the number of padding bits filled into the compressed data CD) for restoring the pre-compressed data PCD. For example, the padding information is recorded in physical blocks for storing system data in the rewritable non-volatile memory module 106 or in a mapping table. It should be mentioned that even though the padding bit PB is placed after the pre-compressed data PCD in the present exemplary embodiment, the present invention is not limited thereto, and the padding bit PB may also be placed before the pre-compressed data PCD or inserted into the pre-compressed data PCD.

Thereafter, the ECC circuit 210 generates a corresponding ECC code ECC according to the compressed data CD.

Next, referring to FIG. 5 again, the memory management circuit 202 merges a predetermined padding data PD, the compressed data CD, and the ECC code ECC to generate an ECC frame ECCF. Herein each bit of the predetermined padding data PD is 'F'. However, the present invention is not limited thereto, and the predetermined padding data may be in any data pattern.

To be specific, as described above, the memory management circuit 202 encodes data from the host system 1000 into an ECC frame with a fixed length and writes the ECC frame into the rewritable non-volatile memory module 106. The length of the compressed data CD is smaller than that of the data WD. Thus, the memory management circuit 202 inserts the predetermined padding data PD between the compressed data CD and the ECC code ECC. For example, in the present exemplary embodiment, because the length of the compressed data output by the data compression/decompression circuit 208 is 1K, the length of the predetermined padding data PD is designed to be 1K such that the length of the data to be written into the physical pages can be maintained at 2K. Herein the compressed data CD and the predetermined padding data PD are generally referred to as a user data UD.

Even though in the present exemplary embodiment, the predetermined padding data PD is inserted between the compressed data CD and the ECC code ECC, the present invention is not limited thereto, and the predetermined padding data PD may also be placed before the compressed data CD.

Additionally, in a system in which data can be written into the rewritable non-volatile memory module 106 by using an ECC frame with a variable length, the ECC frame may be generated by not using any predetermined padding data. Particularly, in the present example, one physical page can store more ECC frames after the data is compressed. Thus, the number of times for programming a physical page (i.e., writing data into a physical page) can be reduced, and accordingly the performance of the memory storage apparatus can be improved.

Finally, the memory management circuit 202 writes the ECC frame ECCF into the physical page 402.

Thereafter, when the memory management circuit 202 is about to read data from the physical page 402 in response to the host system 1000, the memory management circuit 202 and the data compression/decompression circuit 208 need to restore the data through a reversed procedure.

Figure 7:
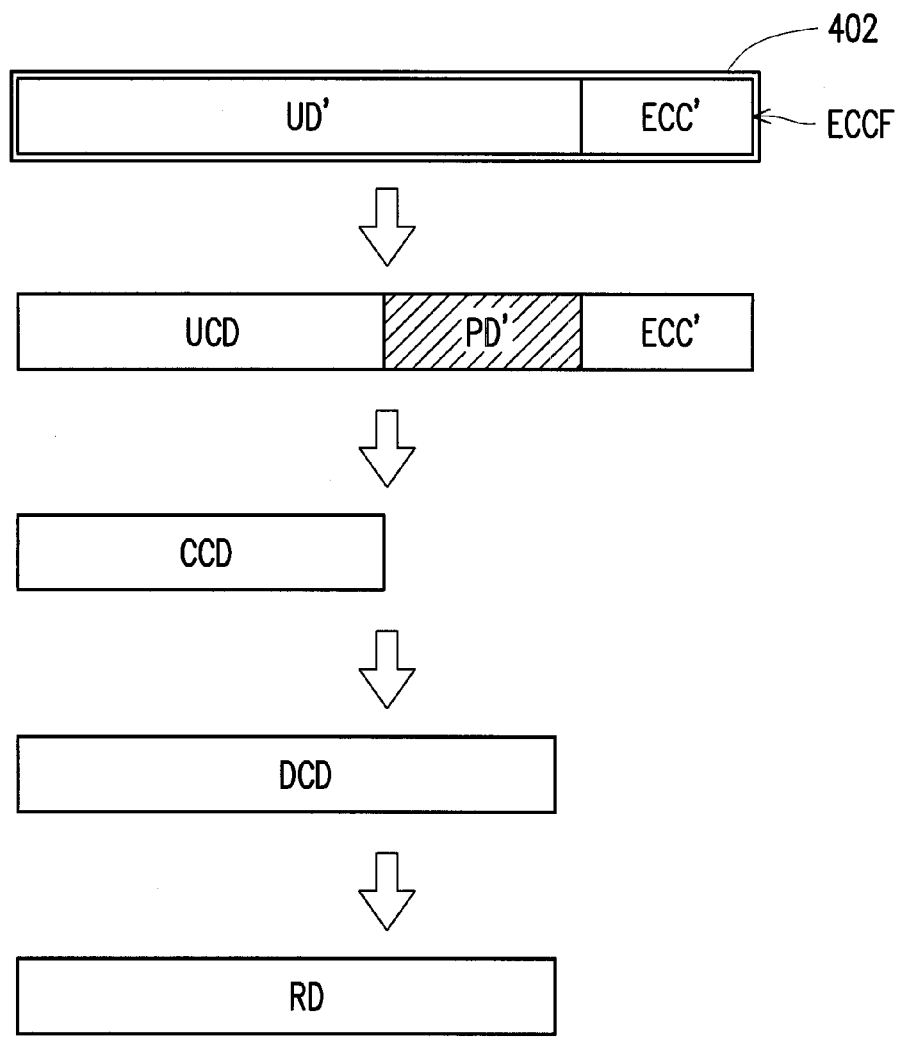
FIG. 7 is a diagram of reading data from a physical page according to an exemplary embodiment of the present invention.

FIG. 7 is a diagram of reading data from a physical page according to an exemplary embodiment of the present invention.

Referring to FIG. 7, it is assumed that the host system 1000 is about to read data (i.e., the previously written data WD) from the physical page 402. First, the memory management circuit 202 reads an ECC frame ECCF' from the physical page 402, wherein the ECC frame ECCF' contains a user data UD' corresponding to the user data UD and an ECC code ECC' corresponding to the ECC code ECC.

Then, the memory management circuit 202 obtains an uncorrected data UCD from the user data UD'. To be specific, because the predetermined padding data PD is inserted to a fixed position between the compressed data CD and the ECC code ECC when the data is written, the memory management circuit 202 can delete the predetermined padding data PD' from the user data UD' to obtain the uncorrected data UCD corresponding to the compressed data CD.

Next, the ECC circuit 210 executes an error checking and correcting procedure on the uncorrected data UCD according to the ECC code ECC' to generate a corrected data CCD. Herein when the number of error bits in the ECC code ECC' and the uncorrected data UCD is smaller than 40, the ECC circuit 210 can successfully correct these error bits.

Thereafter, the data compression/decompression circuit 208 determines whether the corrected data CCD contains any padding bit PB according to the stored padding information. If the corrected data CCD does not contain any padding bit PB, the data compression/decompression circuit 208 decompresses the corrected data CCD to generate a decompressed data DCD. If the corrected data CCD contains padding bits, the data compression/decompression circuit 208 removes the padding bits PB from the corrected data CCD according to the padding information and then decompresses the corrected data CCD without any padding bit to generate the decompressed data DCD.

Finally, the memory management circuit 202 serves the decompressed data DCD as data RD to be read by the host system 1000 and transmits the data RD to the host system 1000.

Figure 8:
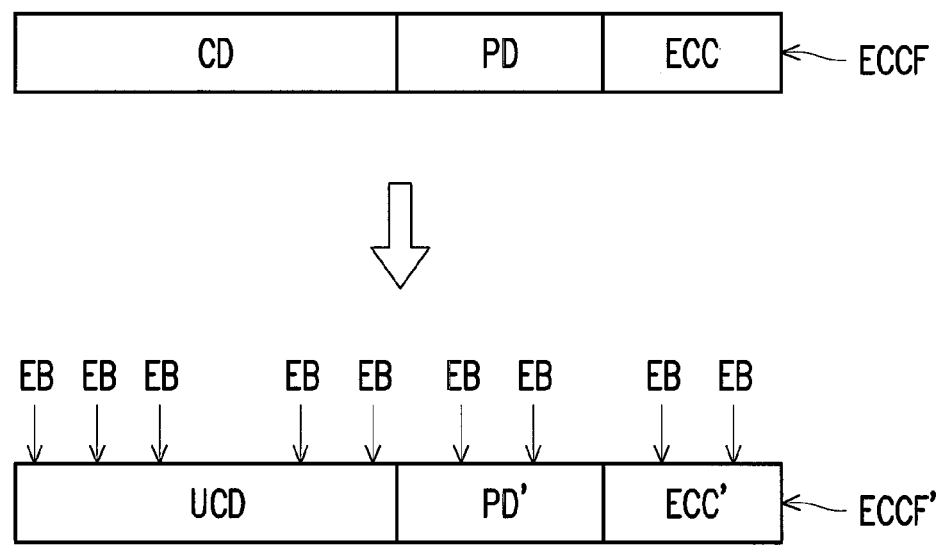
FIG. 8 is a simplified diagram illustrating the distribution of error bits according to an exemplary embodiment of the present invention.

FIG. 8 is a simplified diagram illustrating the distribution of error bits according to an exemplary embodiment of the present invention, wherein the error bit distribution is the same as that illustrated in FIG. 1, and it is assumed that in FIG. 1, the original data OD cannot be restored according to the ECC code ECC because the number of error bits exceeds the number (for example, 7) of error bits that can be corrected by the ECC circuit 210.

Referring to FIG. 8, the ECC code ECC is generated according to the compressed data CD when the data is written. Thus, when the data is read, the uncorrected data UCD corresponding to the compressed data CD is corrected according to the ECC code ECC'. Herein because the number of error bits EB in the uncorrected data UCD and the ECC code ECC' is 7, the ECC circuit 210 can still successfully correct the uncorrected data UCD to restore the compressed data CD. To be specific, 2 of the 9 error bits EB illustrated in FIG. 8 take place in the predetermined padding data PD', and the uncorrected data UCD and the ECC code ECC' contain only 7 error bits EB. Thus, the number of error bits to be corrected does not exceed the number of error bits that can be corrected by the ECC circuit 210. Subsequently, the compressed data CD can be successfully decompressed to obtain the data RD (i.e., the original data WD).

Figure 9:
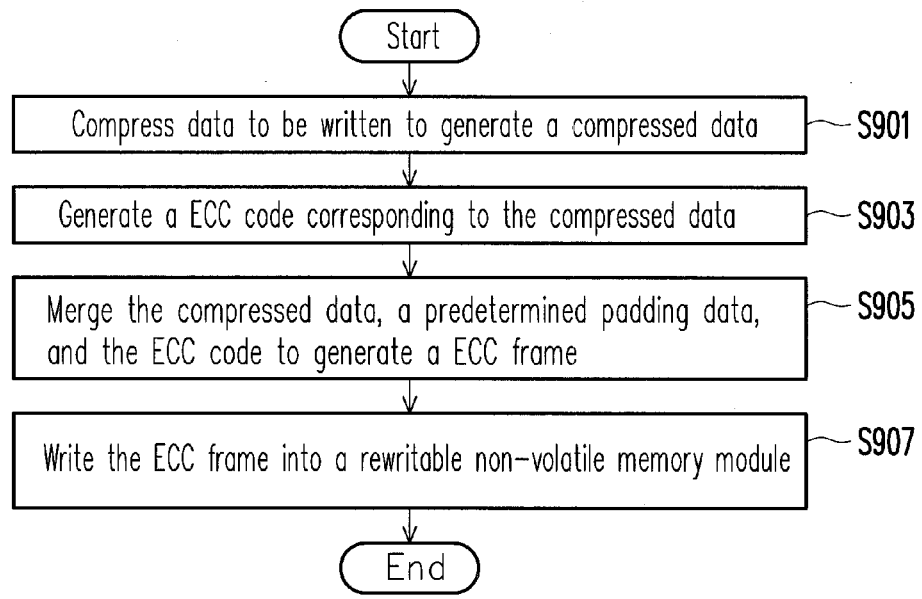
FIG. 9 is a flowchart of a data writing method according to an exemplary embodiment of the present invention.

FIG. 9 is a flowchart of a data writing method according to an exemplary embodiment of the present invention, wherein the steps for writing data belonging to an ECC frame into the rewritable non-volatile memory module 106 are illustrated.

Referring to FIG. 9, when the memory management circuit 202 is about to write the data into the rewritable non-volatile memory module 106, in step S901, the data compression/decompression circuit 208 compresses the data to generate a compressed data, and in step S903, the ECC circuit 210 generates an ECC code corresponding to the compressed data.

In step S905, the memory management circuit 202 merges the compressed data, a predetermined padding data, and the ECC code to generate the ECC frame. In step S907, the memory management circuit 202 writes the ECC frame into the rewritable non-volatile memory module 106.

Figure 10:
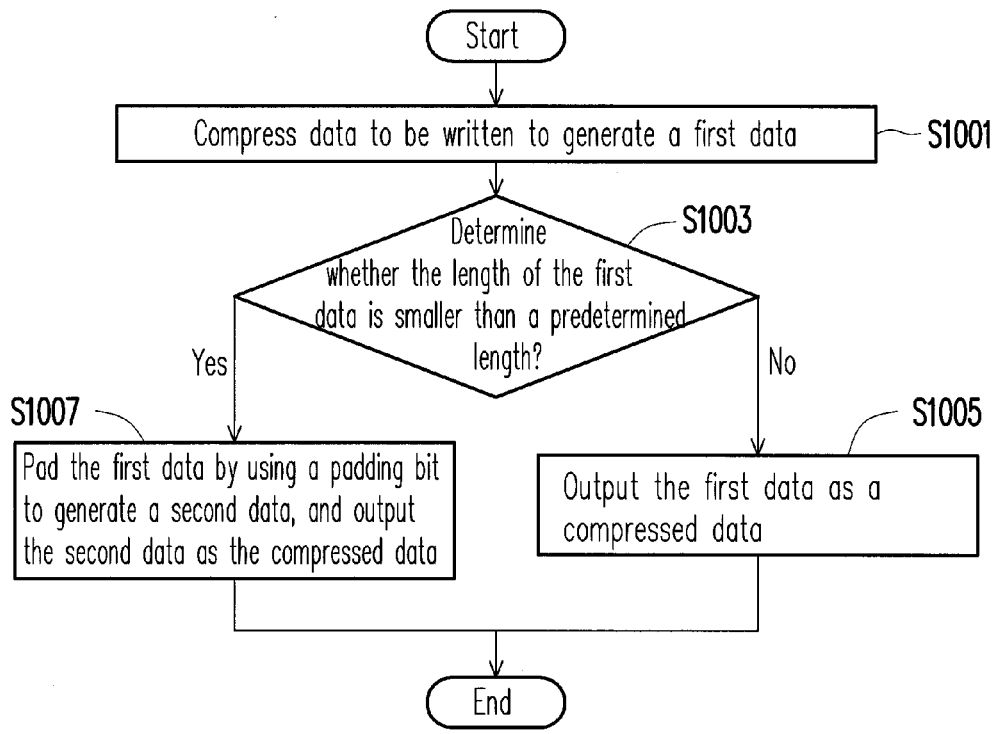
FIG. 10 is a detailed flowchart of step S901 in FIG. 9 according to an exemplary embodiment of the present invention.

FIG. 10 is a detailed flowchart of step S901 in FIG. 9 according to an exemplary embodiment of the present invention.

Referring to FIG. 10, in step S1001, the data compression/decompression circuit 208 compresses the data to be written to generate a first data. In step S1003, the data compression/decompression circuit 208 determines whether the length of the first data is smaller than a predetermined length.

If the length of the first data is not smaller than the predetermined length, in step S1005, the data compression/decompression circuit 208 outputs the first data as a compressed data.

If the length of the first data is smaller than the predetermined length, in step S1007, the data compression/decompression circuit 208 pads the first data by using a padding bit to generate a second data and serves the second data as the compressed data, wherein the length of the second data is equal to the predetermined length.

Figure 11:
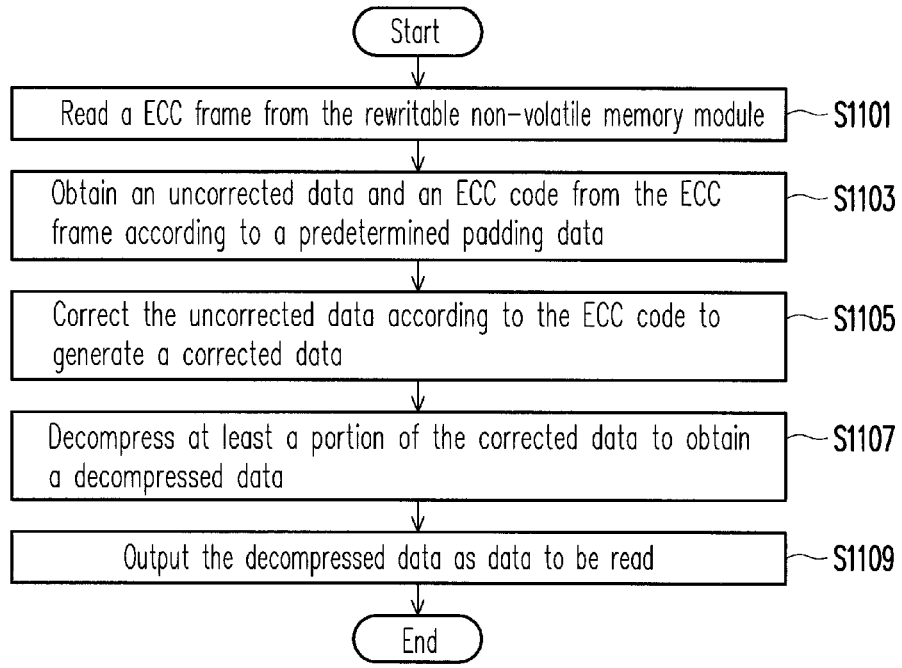
FIG. 11 is a flowchart of a data reading method according to an exemplary embodiment of the present invention.

FIG. 11 is a flowchart of a data reading method according to an exemplary embodiment of the present invention, wherein the steps for reading data belonging to an ECC frame from the rewritable non-volatile memory module 106 are illustrated.

Referring to FIG. 11, in step S1101, the memory management circuit 202 reads an ECC frame from the rewritable non-volatile memory module 106. In step S1103, the memory management circuit 202 obtains an uncorrected data and an ECC code from the ECC frame according to a predetermined padding data.

In step S1105, the ECC circuit 210 corrects the uncorrected data according to the ECC code to generate a corrected data.

In step S1107, the data compression/decompression circuit 208 decompresses at least a portion of the corrected data to obtain a decompressed data.

In step S1109, the memory management circuit 202 outputs the decompressed data as the data to be read.

Figure 12:
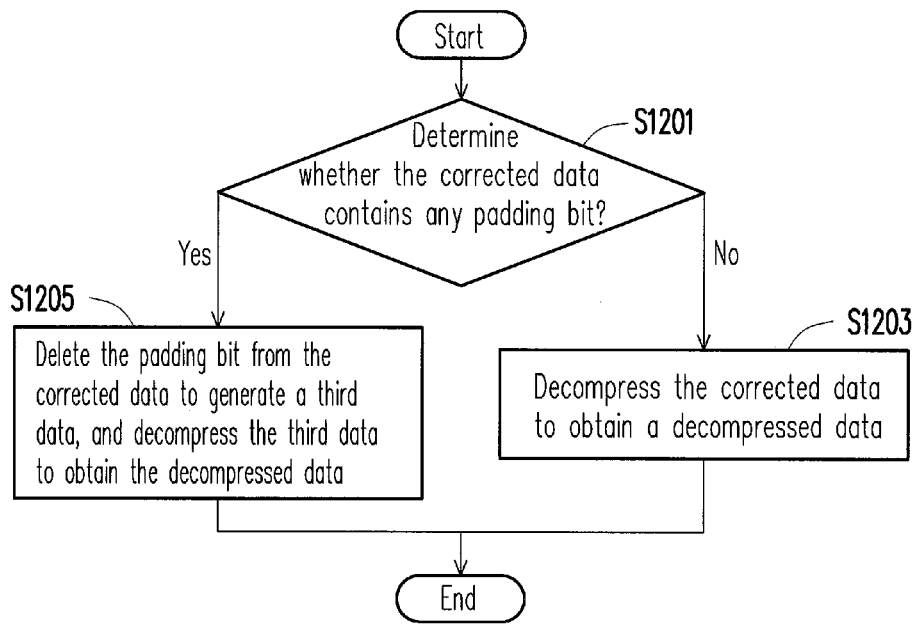
FIG. 12 is a detailed flowchart of step S1107 in FIG. 11 according to an exemplary embodiment of the present invention.

FIG. 12 is a detailed flowchart of step S1107 in FIG. 11 according to an exemplary embodiment of the present invention.

Referring to FIG. 12, in step S1201, the data compression/decompression circuit 208 determines whether the corrected data contains any padding bit. For example, the data compression/decompression circuit 208 determines whether the corrected data contains any padding bit according to the padding information stored when the data is written.

If the corrected data does not contain any padding bit, in step S1203, the data compression/decompression circuit 208 decompresses the corrected data to obtain a decompressed data.

If the corrected data contains at least one padding bit, in step S1205, the data compression/decompression circuit 208 deletes the padding bit from the corrected data to generate a third data and decompresses the third data to obtain the decompressed data.

In summary, in the data writing and reading method provided by an exemplary embodiment of the present invention, a data to be written is compressed so that more error bits can be corrected by using an existing ECC circuit and the accuracy of the data can be ensured. Moreover, in a memory storage apparatus provided by an exemplary embodiment of the present invention, a memory controller using foregoing method is adopted for managing a rewritable non-volatile memory module so that the reliability of data access can be effectively improved. The previously described exemplary embodiments of the present invention have the advantages aforementioned, wherein the advantages aforementioned not required in all versions of the present invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A data writing method for writing data into a rewritable non-volatile memory module, the data writing method comprising:
   compressing the data to generate a first data;
   determining whether a length of the first data is smaller than a predetermined length;
   when the length of the first data is not smaller than the predetermined length, outputting the first data as a compressed data;
   when the length of the first data is not smaller than the predetermined length, padding the first data by using at least one padding bit to generated a second data, and outputting the second data as the compressed data, wherein a length of the second data is equal to the predetermined length;
   inputting the compressed data without a predetermined padding data into an error checking and correcting circuit to generate an error checking and correcting (ECC) code corresponding to the compressed data;
   generating an ECC frame according to the compressed data, the ECC code corresponding to the compressed data, and the predetermined padding data; and writing the ECC frame into the rewritable non-volatile memory module.

2. The data writing method according to claim 1 further comprising:
receiving another data;
compressing the another data to generate another compressed data corresponding to the another data;
generating another ECC code corresponding to the another compressed data;
generating another ECC frame according to the another compressed data and the another ECC code; and
writing the ECC frame and the another ECC frame into one of a plurality of physical pages of the rewritable non-volatile memory module.

3. A data reading method for reading data from a rewritable non-volatile memory module, the data reading method comprising:
reading an ECC frame from the rewritable non-volatile memory module;
obtaining an uncorrected data and an ECC code corresponding to the uncorrected data from the ECC frame by deleting a predetermined padding data from the ECC frame;
correcting the uncorrected data according to the ECC code to generate a corrected data;
decompressing at least a portion of the corrected data to obtain a decompressed data; and
outputting the decompressed data to a host system,
wherein the step of decompressing at least a portion of the corrected data to obtain the decompressed data comprises: determining whether the corrected data includes at least one padding bit; when the corrected data does not include the at least one padding bit, decompressing the corrected data to obtain the decompressed data; and when the corrected data includes the at least one padding bit, deleting the at least one padding bit from the corrected data to generated a third data, and decompressing the third data to obtain the decompressed data.

4. A memory controller for writing data from a host system into a rewritable non-volatile memory module, the memory controller comprising:
a host interface, configured to couple to the host system;
a memory interface, configured to couple to the rewritable non-volatile memory module;
a memory management circuit, coupled to the host interface and the memory interface and configured to receive the data through the host interface;
an ECC circuit, coupled to the memory management circuit; and
a data compression/decompression circuit, coupled to the memory management circuit,
wherein the data compression/decompression circuit compresses the data to generate a first data,
wherein the data compression/decompression circuit determines whether a length of the first data is smaller than a predetermined length, and when the length of the first data is not smaller than the predetermined length, the data compression/decompression circuit outputs the first data as a compressed data,
wherein when the length of the first data is smaller than the predetermined length, the data compression/decompression circuit pads the first data by using at least one padding bit to generated a second data and outputting the second data as the compressed data, wherein a length of the second data is equal to the predetermined length,
wherein the ECC circuit generates an ECC code corresponding to the compressed data without a predetermined padding data,
wherein the memory management circuit generates an ECC frame by merging the compressed data, the ECC code corresponding to the compresses data, and the predetermined padding data,
wherein the memory management circuit writes the ECC frame into the rewritable non-volatile memory module.

5. The memory controller according to claim 4,
wherein the rewritable non-volatile memory module has a plurality of physical pages,
wherein the memory management circuit further receives another data from the host system,
wherein the data compression/decompression circuit further compresses the another data and generates another compressed data corresponding to the another data,
wherein the ECC circuit further generates another ECC code corresponding to the another compressed data,
wherein the memory management circuit generates another ECC frame according to the another compressed data and the another ECC code,
wherein the memory management circuit writes the ECC frame and the another ECC frame into one of the physical pages.

6. A memory controller for reading data from a rewritable non-volatile memory module, the memory controller comprising:
a host interface, configured to couple to a host system;
a memory interface, configured to couple to the rewritable non-volatile memory module;
a memory management circuit, coupled to the host interface and the memory interface;
an ECC circuit, coupled to the memory management circuit; and
a data compression/decompression circuit, coupled to the memory management circuit,
wherein the memory management circuit reads an ECC frame from the rewritable non-volatile memory module,
wherein the memory management circuit further obtains an uncorrected data and an ECC code corresponding to the uncorrected data from the ECC frame by deleting a predetermined padding data from the ECC frame,
wherein the ECC circuit corrects the uncorrected data according to the ECC code to generate a corrected data,
wherein the data compression/decompression circuit decompresses at least a portion of the corrected data to obtain a decompressed data,
wherein the memory management circuit outputs the decompressed data to the host system through the host interface,
wherein the data compression/decompression circuit determines whether the corrected data includes at least one padding bit,
wherein when the corrected data does not include the at least one padding bit, the data compression/decompression circuit decompresses the corrected data to obtain the decompressed data,
wherein when the corrected data includes the at least one padding bit, the data compression/decompression circuit deletes the at least one padding bit from the corrected data to generate a third data and decompresses the third data to obtain the decompressed data.

7. A memory storage apparatus, comprising:
a connector, configured to couple to a host system;
a rewritable non-volatile memory module; and a memory controller, coupled to the connector and the rewritable non-volatile memory module, wherein the memory controller receives data from the host system, wherein the memory controller further compresses the data to generate a first data, wherein the memory controller determines whether a length of the first data is smaller than a predetermined length, and when the length of the first data is not smaller than the predetermined length, the memory controller outputs the first data as a compressed data, wherein when the length of the first data is smaller than the predetermined length, the memory controller pads the first data by using at least one padding bit to generate a second data and outputting the second data as the compressed data, wherein a length of the second data is equal to the predetermined length, wherein the memory controller further inputs the compressed data without a Predetermined padding data into an error checking and correction circuit generate an ECC frame according to the compressed data, wherein the memory controller further generates an ECC frame by merging the compressed data, the ECC code corresponding to the compressed data, and the predetermined padding data, wherein the memory controller further writes the ECC frame into the rewritable non-volatile memory module.

8. The memory storage apparatus according to claim 7, wherein the rewritable non-volatile memory module has a plurality of physical pages, wherein the memory controller further receives another data from the host system, wherein the memory controller compresses the another data to generate another compressed data corresponding to the another data, wherein the memory controller generates another ECC code corresponding to the another compressed data, wherein the memory controller generates another ECC frame according to the another compressed data and the another ECC code, wherein the memory controller writes the ECC frame and the another ECC frame into one of the physical pages.

9. A memory storage apparatus, comprising:

a connector, configured to couple to a host system;

a rewritable non-volatile memory module; and a memory controller, coupled to the connector and the rewritable non-volatile memory module, wherein the memory controller reads an ECC frame from the rewritable non-volatile memory module, wherein the memory controller further obtains an uncorrected data and an ECC code from the ECC frame by deleting a predetermined padding data from the ECC frame, wherein the memory controller further corrects the uncorrected data according to the ECC code to generate a corrected data, wherein the memory controller further decompresses at least a portion of the corrected data to obtain a decompressed data and outputs the decompressed data to the host system through the connector, wherein the memory controller determined whether the corrected data includes at least one padding bit, wherein when the corrected data does not include the at least one padding bit, the memory controller decompresses the corrected data to obtain the decompressed data, wherein when the corrected data includes the at lest one padding bit, the memory controller deletes the at least one padding bit, form the corrected data to generate a third data and decompresses the third data to obtain the decompressed data.

* * * * *